United States Patent [19]
Bialek

[11] 3,927,907
[45] Dec. 23, 1975

[54] AUTOMOBILE BUMPER
[76] Inventor: Francis J. Bialek, 2536 N. Sawyer Ave., Chicago, Ill. 60647
[22] Filed: July 19, 1974
[21] Appl. No.: 490,092

[52] U.S. Cl................. 293/71 R; 267/30; 267/47; 293/85
[51] Int. Cl.² ........................................ B60R 19/02
[58] Field of Search ........ 293/71 R, 85, 86; 267/30, 267/47

[56] References Cited
UNITED STATES PATENTS

| | | | |
|---|---|---|---|
| 955,624 | 4/1910 | Welton............................. | 293/71 R |
| 1,216,268 | 2/1917 | Batenburg........................... | 267/30 |
| 1,302,279 | 4/1919 | Barnett.............................. | 293/86 |
| 1,571,713 | 2/1926 | Emery................................ | 267/30 |
| 1,686,991 | 10/1928 | Schauman et al. ............... | 293/85 X |
| 1,697,204 | 1/1929 | Nomicos............................. | 293/85 |
| 2,573,510 | 10/1951 | Terranova......................... | 293/85 |

FOREIGN PATENTS OR APPLICATIONS

| | | | |
|---|---|---|---|
| 457,970 | 9/1913 | France.............................. | 293/85 |

Primary Examiner—Evon C. Blunk
Assistant Examiner—Andres Kashnikow

[57] ABSTRACT

A bumper for motor vehicles including a strip of resilient material, such as a rubber or polyurethane material attached to and protruding forward from a bumper member constructed from a more rigid material such as steel. A pair of leaf springs are attached to the bumper member and to the frame of the motor vehicle. The leaf springs may be constructed into an arch shape. Furthermore a resilient cushion member may be secured between the leaf springs and the bumper member within the space defined by the arch.

2 Claims, 4 Drawing Figures

U.S. Patent Dec. 23, 1975 3,927,907
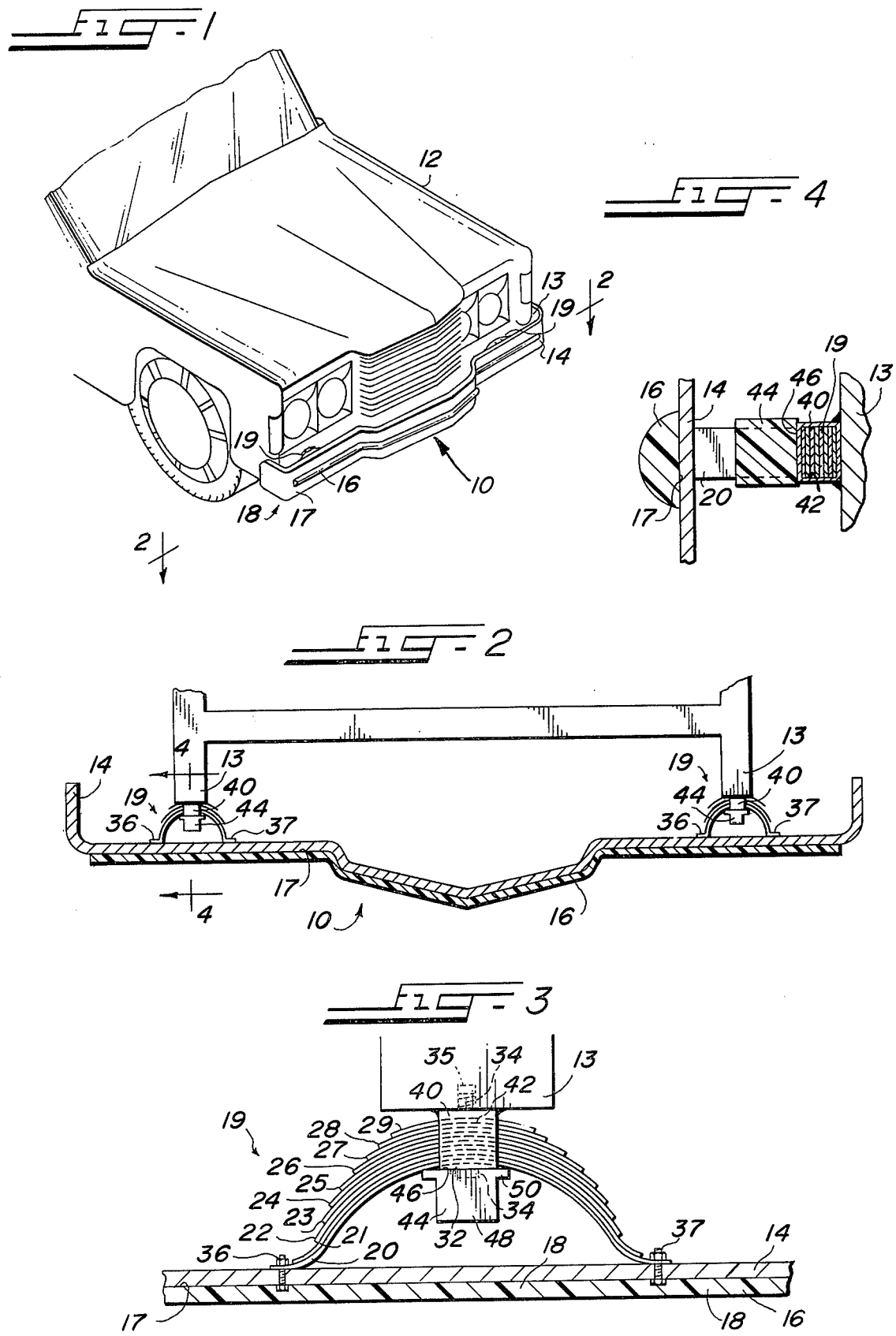

AUTOMOBILE BUMPER

BACKGROUND OF THE INVENTION

This invention relates generally to bumpers for motor vehicles and more specifically relates to bumpers having a plurality of resilient shock absorbing means.

Throughout the past forty to fifty years a large body of art pertaining to bumpers and shock absorbers has been developed. The conventional automotive bumper includes a rigid metal bumper bar bolted or otherwise rigidly secured to the forward end of the automotive frame. Generally, a pair of resilient bumper guards may be purchased as an auto accessory and bolted to the bumper bar, so that it protruded forward therefrom. Springs such as leaf springs mounted between the bumper bar and automotive frame have been used in the past for shock absorbing purposes. Examples of such prior spring bumpers may be found in U.S. Pat. Nos. 2,573,510 and 1,698,207.

The subject invention provides an improved shock absorbing bumper having a plurality of shock absorbing means. In an embodiment of the subject invention a resilient means is secured to the front of a bumper bar constructed of more rigid material. A spring means comprising a plurality of laminated leaf springs, is fastened to the bumper bar and the frame of the automotive vehicle. Another resilient means is disposed between the spring means and the bumper bar.

It is therefore a primary object of the subject invention to provide a shock absorbing bumper means for motive vehicles.

Another object is to provide a bumper means having a spring means including laminated leaf springs.

Another object is to provide a bumper bar of rigid construction and having a resilient strip of material secured forward of such bumper bar.

Still another object is to position a resilient means between the spring means and the bumper bar.

BRIEF DESCRIPTION OF THE DRAWINGS

Referring to the drawings in which the same characters of reference are employed to indicate corresponding similar parts throughout the several figures of the drawings.

FIG. 1 is a perspective view of the bumper means embodying the principles of the invention, attached to the automotive vehicle;

FIG. 2 is a sectional view of the bumper, taken on the plane of the line 2—2 in FIG. 1, and viewed in the direction indicated;

FIG. 3 is a fragmentary enlarged view of the shock absorbing means of the bumper; and FIG. 4 is a sectional enlarged view, taken on the plane of the line 4—4 in FIG. 2, and viewed in the direction indicated.

DESCRIPTION OF THE PREFERRED EMBODIMENT

Referring now to FIG. 1 of the drawing, the reference number 10 indicates generally a bumper means for moving vehicles, such as automotive vehicle 12. The bumper means 10 is secured to the front frame 13 of the vehicle 12.

The bumper means comprises a bumper member or bar 14 which extends the entire width of vehicle 12. Bumper bar 14 may be constructed from a suitable metal such as steel. An elongated strip 16 of a resilient material such as rubber or polyurethane is secured to the front 17 of bumper bar 14 by a suitable cement or glue, or by a screw arrangement (not shown). The rubber or polyurethane may be of a hard construction. Alternatively, as shown only in FIG. 3, instead of the single strip 16 of resilient material, strip 16 may comprise a plurality of sections 18 of resilient material separately attached to the front 17 of the bumper bar 14, in an end to end manner and the entire length of such sections would equal the length of the strip 16.

A pair of spaced apart spring means, each indicated generally by reference numeral 19, is positioned between the vehicle frame 13 and bumper bar 14. Spring means 18 comprises a plurality of leaf springs identified by numerals 20 through 29, laminated one in back of the other in an arch or semielliptical configuration.

Turning now to FIG. 3, it will be seen that the leaf springs 20–29 are shown having increasing arcuate length from the innermost leaf spring 29 to the outermost leaf spring 20. All the leaf springs 20–29 are connected together at the arch or hump point 32, and connected to the frame 13, by screw 34 received in threaded hole 35. Other suitable securing means may of course be used. The outermost spring 20 includes a pair of legs 36, 37 sliding against the bumper bar 14.

A hollow tube 40 encircles the spring means 18 at the hump 32. As shown, leaf springs 20–29 extend through a hole 42 formed in the tube 40. The screw 34 also extends through the tube 40. Tube 40 is rigid and may be formed from metal such as steel.

As may be seen in FIG. 2, a cushion means 44 is bonded or otherwise secured to the outer side 46 of tube 40. The cushion 44 is centrally positioned in the space between the legs 36, 37 of the spring means 18. The cushion 44 may include a cylindrical body portion 48 integrally formed to a circular collar 50.

Therefore, as shown in the figures, two sets of spring means 19, tubes 40, and cushions 44 are secured between frame 13 and bumper bar 14. For greater cushioning and shock absorbing qualities more than two sets of springs 19 and cushions 44 may be used.

Instead of securing the leaf springs together with the single screw 34, each individual spring may be attached to the adjacent spring with a screw and lock nut arrangement, or may be welded one to the other, and the secured laminated spring means may be attached to the automotive frame 13. Moreover, instead of using the hollow tube 40, the cushion means 44 may be bonded directly to the spring means 19 at the hump 32.

As the foregoing indicates, the subject invention provides a plurality of shock absorbing means. The bumper bar 14 and strip 16 absorb initial and small shocks. For greater shocks, spring means 19 assist to smooth the effects thereof. In the event, the front end 13 of the auto 12 has a damaging impact causing the bumper bar to bend inward, cushion means 44 provides an additional shock absorbing body for reducing the effects of such impact.

The resilient strip 16 may have a three foot length and a three inch width, and preferably constructed from a hard rubber or a polyurethane plastic material having an 80–90 durometer reading. Strip 16 could be screwed on in one piece or installed in sections along the entire length of the bumper bar 14. The bumper bar 14 with strip 16 may have a four inch inward travel.

Although the leaf springs 20–29 are shown having different lengths, each spring may be of the same dimension, such as for example a 0.120–0.130 inch thickness, a 2 inch width and a 16½ inch span, and may be formed from a tempered spring steel.

It is also within the contemplation of the invention to include a limit switch (not shown) which is triggered from an off-position to an on-position when the bumper travels inward for example, about 2 inches to automatically turn-off the engine. The limit switch may include a thyristor switch or a similar semi-conductor device, positioned in the electrical circuit between the power supply and ignition. When the limit switch switches to the on-position upon impact or collision, the power to the thyristor is blocked or the direction of current flow through the thyristor is reversed, which in turn, severs power to the ignition. If, for example, four limit switches were used each would control the on-off state of the SCR, for severing ignition power to turn off the engine. In this manner, the vehicle upon impact, provides a safeguard from fire, due to a ruptured or broken fuel line or gas tank.

The foregoing specification and description are intended as illustrative of the invention, the scope of which is defined in the following claims.

I claim:

1. A bumper for attaching to the frame of moving vehicles comprising:
   a bumper bar constructed of a rigid material extending across the width of the vehicle and including outer ends;
   a first spring means and a second spring means, each of said spring means having a substantially "U" shape and including a hump portion between a pair of outer feet;
   the pair of feet of said first spring means being attached to one of the ends of said bumper bar so that said first spring means extends inward therefrom, and the pair of feet of said second spring means being attached to the other end of said bumper bar so that said second spring means also extends inward therefrom;
   said first and second spring means including a plurality of leaf springs laminated one on back of the other;
   a first and second hollow member each including a front side and a rear side, each of said plurality of leaf springs passing through one of said hollow members so that said hump portion of the corresponding spring means is positioned in the hollow member, each of said hollow members being attached to the frame at the rear side thereof for securing said hump portion of the corresponding spring means to the frame;
   a first cushioning means attached to the front side of the first hollow member and extending forward thereof spaced from the bumper bar and between the feet of said first spring means; and
   a second cushioning means attached to the front side of the second hollow member and extending forward thereof spaced from the bumper bar and between the feet of said second spring means.

2. The bumper of claim 1 further includes:
   a strip of resilient material extending longitudinally across the length of the bumper bar and secured to the front side of the bumper bar and protruding forward therefrom, said spring means being attached to the rear side of the bumper bar.

* * * * *